US006459810B1

(12) United States Patent
Cring

(10) Patent No.: US 6,459,810 B1
(45) Date of Patent: Oct. 1, 2002

(54) METHOD AND APPARATUS FOR FORMING VARIANT SEARCH STRINGS

(75) Inventor: Christopher T. Cring, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/390,223

(22) Filed: Sep. 3, 1999

(51) Int. Cl.$^7$ .............. G06K 9/03; G06K 9/34; G06K 9/72; H04N 1/00; G06F 17/30
(52) U.S. Cl. ............ 382/229; 382/173; 382/177; 382/231; 382/305; 382/309; 382/310; 358/403; 707/3; 707/5; 707/6; 707/530
(58) Field of Search .................... 382/103, 159, 382/161, 173, 177, 181, 209, 219, 224, 225, 226, 229, 231, 305, 309, 176, 230, 310; 358/403, 404; 707/1–10

(56) References Cited

U.S. PATENT DOCUMENTS

| | | | |
|---|---|---|---|
| 3,182,290 A | | 5/1965 | Rabinow ................. 382/227 |
| 3,996,557 A | | 12/1976 | Donahey ................. 382/186 |
| 4,058,795 A | | 11/1977 | Balm .................... 382/230 |
| 4,453,217 A | * | 6/1984 | Boivie .................... 707/5 |
| 4,471,459 A | * | 9/1984 | Dickinson et al. ......... 707/533 |
| 5,008,818 A | * | 4/1991 | Bocast .................... 714/2 |
| 5,099,425 A | * | 3/1992 | Kanno et al. ............. 704/9 |
| 5,204,914 A | | 4/1993 | Mason et al. ............. 382/161 |
| 5,583,949 A | | 12/1996 | Smith et al. ............. 382/199 |
| 5,600,835 A | | 2/1997 | Garland et al. ............ 707/5 |
| 5,606,690 A | * | 2/1997 | Hunter et al. ............. 707/5 |
| 5,642,442 A | | 6/1997 | Morton et al. ............ 382/287 |
| 5,992,737 A | * | 11/1999 | Kubota ................... 235/380 |
| 6,018,735 A | * | 1/2000 | Hunter ................... 707/5 |

* cited by examiner

Primary Examiner—Leo Boudreau
Assistant Examiner—Daniel G. Mariam
(74) Attorney, Agent, or Firm—Cantor Colburn LLP; William Kinnaman, Jr.

(57) ABSTRACT

An exemplary embodiment of the invention is a method for forming variant search strings. The method includes receiving a search string and parsing the search string to locate a mistaken search string character. A mistaken search string character is a character which is confused with other characters. A variant search string is formed in response to a presence of a mistaken search string character in the search string. The search string and variant search string may then be used to search a database. Another exemplary embodiment of the invention is a system for forming variant search strings. The system includes a user interface for receiving a search string. A variant search string generator parses the search string to locate a mistaken search string character. The mistaken search string character is a character which is confused with other characters. The variant search string generator forms a variant search string in response to a presence of a mistaken search string character in the search string.

12 Claims, 1 Drawing Sheet

METHOD AND APPARATUS FOR FORMING VARIANT SEARCH STRINGS

BACKGROUND OF THE INVENTION

The invention relates to a method and apparatus for forming variant search strings for searching a database. Existing database searching systems allow the user to enter a search string and retrieve information matching the search string. An exemplary database search system allows the user to search a database of message IDs, error message, return codes, system codes, error codes, etc. to determine the nature of a computer problem. With the expansion of the Internet, search engines, knowledge data bases, and online publications this type of search string based searching of databases in increasing.

A drawback to this type of database searching is that the search string and/or the database contents are inaccurate due to commonly mistaken characters. Exemplary commonly mistaken characters are zero and O (upper or lower case) and one and 1. A user entering a search string may erroneously mistake a zero for an O and enter a flawed search string. In addition, the data in the database may be flawed due to confusion of characters in the data entry process.

Users attempt to resolve this problem by entering multiple search strings and requesting a search on all the search strings (e.g., an OR operation). Alternatively, users can enter wildcard characters in the search string to represent any character. A drawback to both these methods is that it requires the user to determine the presence of commonly mistaken characters and adjust the search string accordingly.

BRIEF SUMMARY OF THE INVENTION

An exemplary embodiment of the invention is a method for forming variant search strings. The method includes receiving a search string and parsing the search string to locate a mistaken search string character. A mistaken search string character is a character which is confused with other characters. A variant search string is formed in response to a presence of a mistaken search string character in the search string. The search string and variant search string may then be used to search a database.

Another exemplary embodiment of the invention is a system for forming variant search strings. The system includes a user interface for receiving a search string. A variant search string generator parses the search string to locate a mistaken search string character. The mistaken search string character is a character which is confused with other characters. The variant search string generator forms a variant search string in response to a presence of a mistaken search string character in the search string.

BRIEF DESCRIPTION OF THE DRAWINGS

Referring now to the drawings wherein like elements are numbered alike in the several FIGURES.

DETAILED DESCRIPTION OF THE PREFERRED EMBODIMENTS

Figure 1:
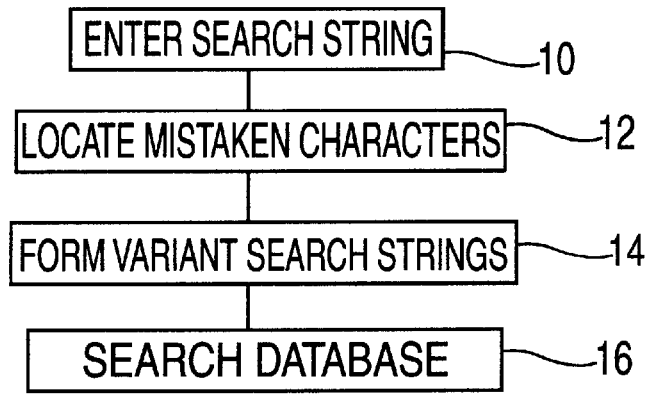
FIG. 1 is a flowchart of a method of searching a database in an exemplary embodiment of the invention.

FIG. 1 is a flowchart depicting a method of searching a database in an exemplary embodiment of the invention. At step 10, the user enters a search string through a user interface as described below with reference to FIG. 3. At step 12, the search string is parsed to locate mistaken search string characters. Mistaken characters are characters which are commonly confused with another character such as O and zero. Examples of alphanumeric mistaken characters are provided herein but it is understood that other types of symbols may be commonly mistaken (e.g., mathematical symbols, scientific symbols, etc.). Accordingly, the term character as used herein is intended to have a broad meaning including alphanumeric, mathematical, scientific and other symbols. A database of mistaken characters may be stored in a memory which can be modified by the user. The mistaken characters are arranged in groups of commonly mistaken characters. The groups of mistaken characters may be arranged as shown below.

Group 1=(o, O, 0)

Group 2=(1, l)

Group 3=(u, µ)

For each mistaken search string character in the search string, a number of variant search strings are created at step 14. The group containing the mistaken search string character is first located. Then, the variant search strings are formed for each mistaken search string character in the search string by substituting the mistaken search string character in the search string with each other mistaken character in the corresponding group. If only one mistaken search string character exists in the search string, the m-1 variant search strings are produced, where m is the number of mistaken characters in the relevant mistaken character group. If, however, multiple mistaken search string characters are present in the search string, step 14 generates variant search strings so that all combinations of mistaken characters are generated. For example, the search string ul will generate variant search strings µl, ul, µl. If the mistaken characters are grouped in groups of two, then $2^n-1$ variant search strings are generated, where n is the number of mistaken search string characters in the search string. Once the variant search strings have been defined, the database is searched using the search string and the variant search strings as shown at 16.

Figure 2:
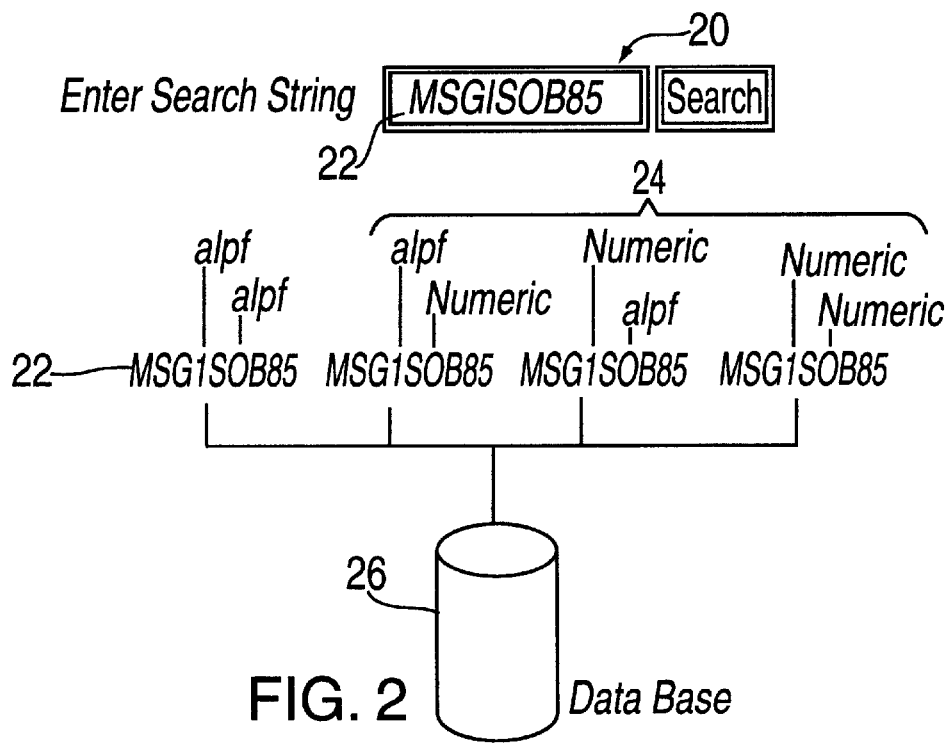
FIG. 2 is a diagrammatic view of the processing performed in FIG. 1.

FIG. 2 is a diagrammatic view of the process shown in FIG. 1. FIG. 2 shows a search string 22 entered in an input area 20 implemented through a user interface. The search string is MSG1(alphabetic)SO(alphabetic)B85. Through steps 12 and 14 described in FIG. 1, the variant search strings MSG1(alphabetic)SO(numeric)B85, MSG1(numeric)SO(alphabetic)B85 and MSG1(numeric)SO(numeric)B85 are generated as shown at 24. The search string 22 and variant search strings 24 are used to search a database shown at 26.

Figure 3:
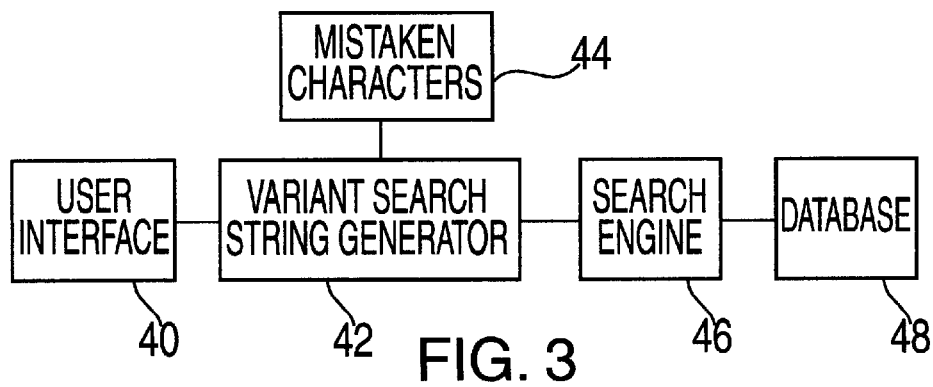
FIG. 3 is a block diagram of a system for searching a database in an exemplary embodiment of the invention.

FIG. 3 is block diagram of a system in an exemplary embodiment of the invention. The system may be implemented on a general purpose computer as described herein. The system includes a user interface 40 which allows the user to enter the search string. The search string is then provided to a variant search string generator 42 which creates the variant search strings as described above with reference to FIGS. 1 and 2. The groups of mistaken characters may be stored in a memory 44 which is accessed by the variant search string generator 42. The user interface 40 may also have access to the mistaken character memory 44 to add or delete mistaken characters. Upon generating the variant search strings, the original search string entered by the user and the variant search strings are provided to a search engine 46. The search engine 46 is instructed by the variant search string generator 42 to search for the search string and variant search strings in a OR operation. The search engine 46 accesses the database 48 and returns the results or "hits" to the user interface 40 as is known in the art.

The system of FIG. 3 may be implemented on one computer. The user interface 40, variant search string generator 42, mistaken character memory 44, search engine 46 and database 48 may all reside on a single machine. The variant search string generator 42 is implemented through a program which operates in conjunction with the search engine program. Alternatively, components of the system may be remotely located. For example, the user interface 40 may be implemented on one computer and the remaining components may be implemented on one or more additional computers coupled to the user interface 40 through a local area network (LAN) or a global network (Internet). If the search engine 46 is an Internet search engine, a front end application (ex: Java script or Java applet running on the client, or CGI, pearl, or Java servelet running on the server) may be used to implement the variant search string generator 42.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for forming variant search strings comprising:

defining at least one set of mistaken search string characters, each said set further comprising at least two mistaken search string characters;

receiving a search string;

parsing said search string to locate at least one of the mistaken search string characters defined in said set;

developing at least one variant search string for the located character, said developed variant search string including a substituted character in place of at least one said located character, said substituted character selected from said set; and providing said search string and said variant search string to a search engine.

2. The method of claim 1 further comprising:

searching a database using said search string and said variant search string.

3. The method of claim 1 wherein:

said developing at least one variant search string includes forming a variant search string for every combination of located characters in said search string.

4. The method of claim 1 wherein:

said search string includes alphanumeric characters.

5. A system for forming variant search strings, the system comprising:

a memory string at least one set of mistaken search string characters, each said set further comprising at least two mistaken search string characters;

a user interface for receiving a search string;

a variant search string generator for parsing said search string to locate at least one of the mistaken search string characters defined in said set;

said variant search string generator developing at least one variant search string for the located character, said developed variant search string including a substituted character in place of at least one said located character, said substituted character selected from said set.

6. The system of claim 5 further comprising:

a database; and a search engine for searching the database using said search string and said variant search string.

7. The system of claim 5, further comprises:

a computer program for developing at least one variant search string for every combination of located characters in said search string.

8. The system of claim 5 wherein:

said search string includes alphanumeric characters.

9. A storage medium encoded with machine-readable computer program code for forming variant search strings, the storage medium including instructions for causing a computer to implement a method comprising;

defining at least one set of mistaken search string characters, each said set further comprising at least two mistaken search string characters;

receiving a search string;

parsing said search string to locate at least one of the mistaken search string characters defined in said set;

developing at least one variant search string for the located character, said developed variant search string including a substituted character in place of at least one said located character, said substituted character selected from said set; and providing said search string and said vacant search string search engine.

10. The storage medium of claim 9 further comprising instructions for causing a computer to implement:

searching a database using said search string and said variant search string.

11. The storage medium of claim 9 wherein:

said developing at least one variant search string includes forming a variant search string for every combination of located characters in said search string.

12. The storage medium of claim 9 wherein:

said search string includes alphanumeric characters.

* * * * *